F. T. ROBERTS.
METHOD OF AND APPARATUS FOR MAKING HOLLOW RUBBER ARTICLES.
APPLICATION FILED JUNE 24, 1918.
1,310,441.
Patented July 22, 1919.
2 SHEETS—SHEET 1.
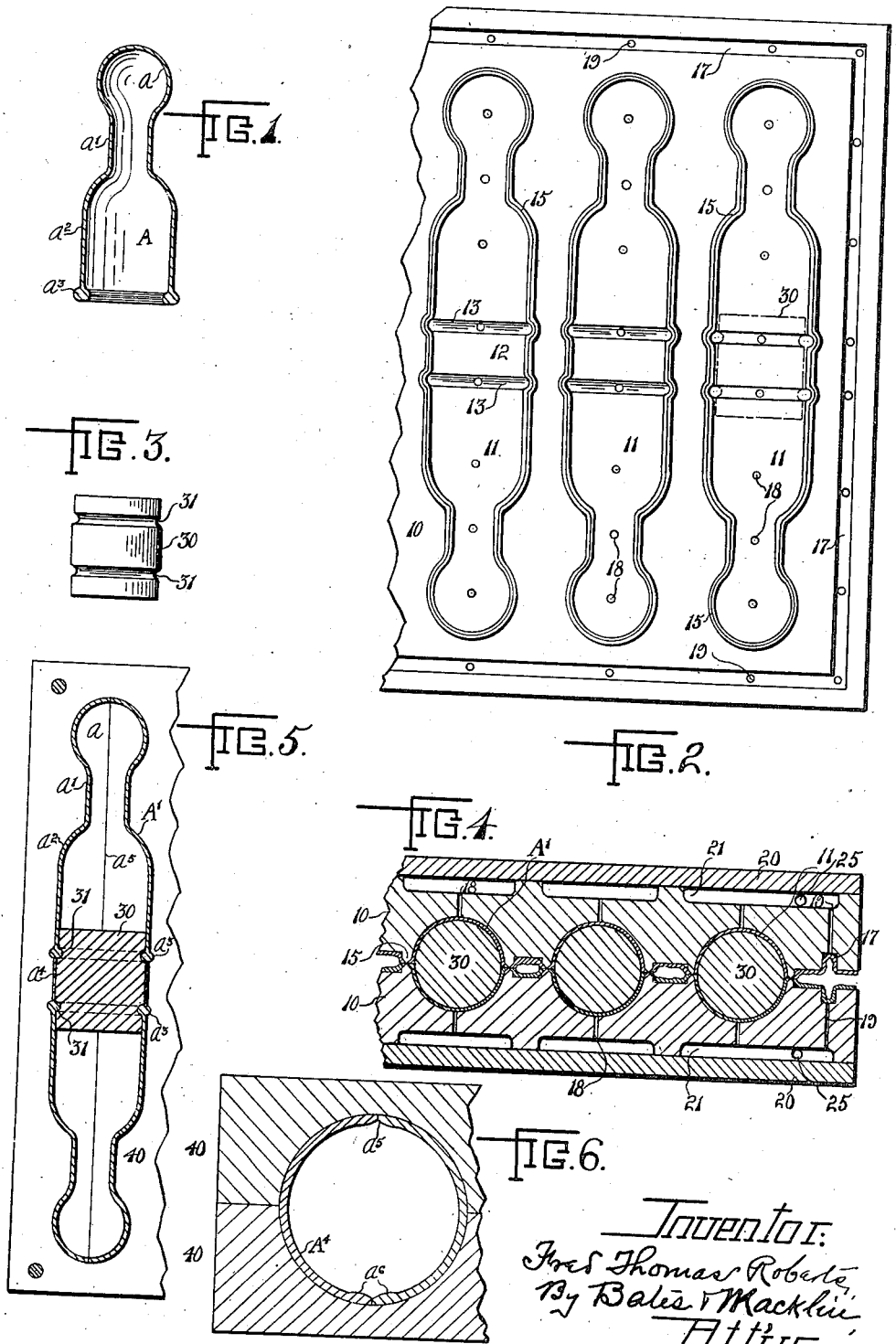

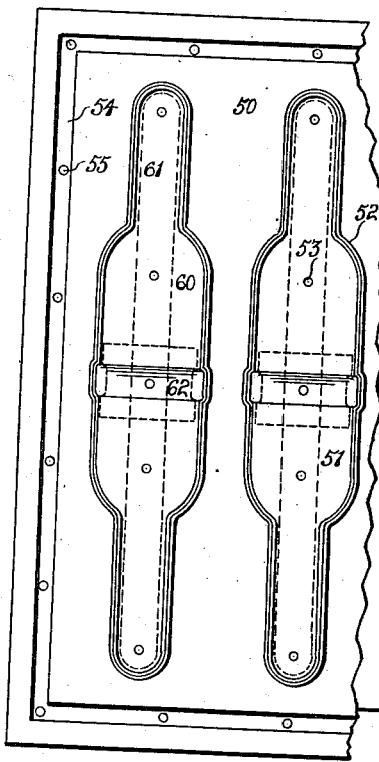
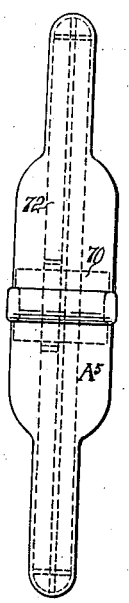
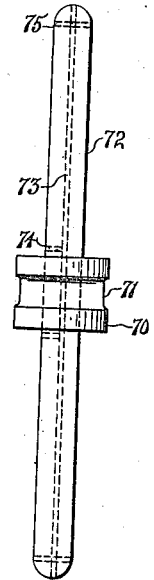
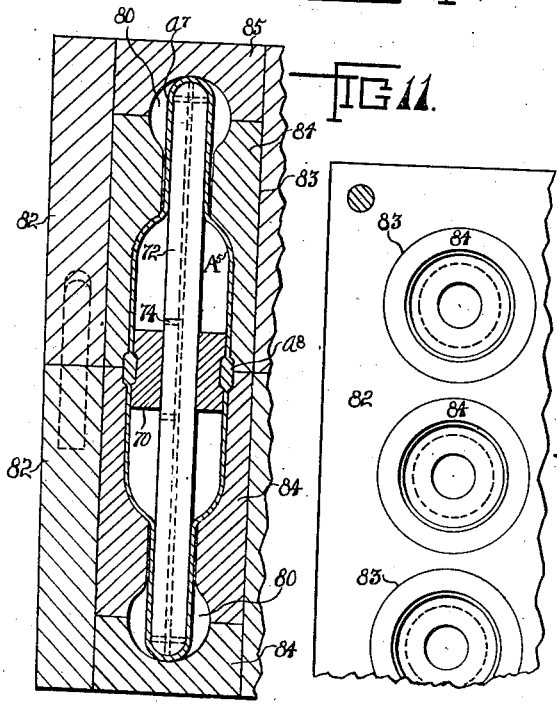

UNITED STATES PATENT OFFICE.

FRED THOMAS ROBERTS, OF CLEVELAND, OHIO, ASSIGNOR TO THE PARAMOUNT RUBBER COMPANY, OF CLEVELAND, OHIO, A CORPORATION OF OHIO.

METHOD OF AND APPARATUS FOR MAKING HOLLOW RUBBER ARTICLES.

1,310,441.     Specification of Letters Patent.     Patented July 22, 1919.

Application filed June 24, 1918. Serial No. 241,466.

*To all whom it may concern:*

Be it known that I, FRED THOMAS ROBERTS, a citizen of the United States, residing at Cleveland, in the county of Cuyahoga and State of Ohio, have invented a certain new and useful Improvement in Methods of and Apparatus for Making Hollow Rubber Articles, of which the following is a full, clear, and exact description, reference being had to the accompanying drawings.

The object of this invention is to provide for the rapid and economical manufacture by mechanical means of hollow rubber articles which have an open end. My method may be advantageously employed to produce nursing nipples having homogeneous walls and in every way as perfect as possible. A frequent method now employed for manufacturing nipples is by hand labor, the rubber being formed on the exterior of a mandrel and vulcanized. This has been expensive, and the nipples produced are not uniform. Another method has been to press the raw rubber in mold cavities about a mandrel shaped according to the interior form of the nipple. This has been unsatisfactory in failing to produce proper seams, and it has also been comparatively expensive. Still another method has been to successively dip a mandrel or mold into a rubber solution, time being allowed between dippings for the solvent to evaporate. This method is slow and expensive and frequently results in defective nipples, as the wall made up in this manner is not homogeneous and unduly large pores may occur.

The present invention is designed to avoid all of the objections above mentioned and to produce a nipple having a uniform thickness of wall made of homogeneous calendered rubber and with perfect seams. By my process and apparatus I make the nipple out of two sheets of calendered raw rubber stock which are respectively seated in mold cavities by pneumatic pressure, after which the two cavities are brought into coaction and the seated stock is sheared off at the rim and a seam formed. The article is then vulcanized. In obtaining the pneumatic seating and the shearing I make the nipples in double units, each unit consisting of two nipples base to base, whereby a complete inclosure is made when the two rubber walls are brought together. Before bringing the walls together I place centrally in one of the sections of the forming mold an annularly grooved plug or core and then bring the two mold sections together compressing the central portion of the rubber, thereby making one or two annular enlargements which form the beads at the bases of the nipples. Such a structure is vulcanized, internal fluid pressure being obtained within the article, and after vulcanization it is sheared apart, producing two complete nipples.

My invention includes the process, and the apparatus, comprising proper molds, mandrels and pneumatic connections, for carrying it out. The drawings illustrate two forms of apparatus, each of which are included within my invention.

In the drawings, Figure 1 is a central longitudinal section of the finished nipple; Fig. 2 is a plan of one embodiment of a forming mold for making a quantity of such nipples; Fig. 3 is an elevation of the central plug or core which may be employed; Fig. 4 is a cross section through several cavities of the complete forming mold, two sheets of rubber stock being shown seated and brought into conjunction to form the double units; Fig. 5 is a longitudinal section through one of the double units in place in one member of a vulcanizing mold; Fig. 6 is an enlarged cross section through one of the cavities of such vulcanizing mold. The remaining figures show a modified form of apparatus; Fig. 7 is a plan of a portion of one member of the forming mold; Fig. 8 is an elevation of the mandrel employed in such mold; Fig. 9 is a cross section through two of the mold members and mandrels, closed upon rubber stock; Fig. 10 is an elevation of the closed article as formed with the mandrel in the interior; Fig. 11 is a cross section of the vulcanizing mold through one of the vulcanizing cavities, showing the formed article and mandrel in position before the spherical heads of the nipple have been inflated by internal pressure; Fig. 12 is a face view of a portion of one of the vulcanizing molds shown in Fig. 11.

As shown in Fig. 1, A indicates the finished nipple having a spherical head $a$, a contracted neck $a^1$, a bell-shaped body $a^2$ and a bead $a^3$ about the base or open end of the body. This bead extends to both the interior and exterior of the bell as shown.

Referring first to the apparatus shown in

Figs. 2 to 6, 10 and 10 indicate a pair of mold plates which are substantially identical with each other. The registration of these plates may be insured by suitable dowel pins or other means, not shown. Each plate has a series of cavities, designated 11, corresponding in contour to two nipples placed end to end with a small intermediate zone 12. The cavity is preferably semi-circular in cross section. At each edge of the central zone 12 there is formed a groove 13 of semi-circular extent. Entirely surrounding the cavity adjacent to its edge is a raised rib 15 coming to a comparatively sharp edge.

Forming a circuit in the face of each plate 10, and inclosing all the mold cavities thereof, is a groove 17. Suitable vents 18 and 19 lead from each cavity 11 and from the groove 17 through the plate 10 to its opposite side. On the outer side of each plate 10 is a plate 20 which has an air-tight connection with the mold plate but leaves an internal passageway 21 with which the vents 18 and 19 communicate. These passage-ways 21 are in communication with a suitable source of vacuum by any tubular connection, not shown, leading from the suction openings 25.

In operating the apparatus just described, a sheet of raw rubber stock is laid across the face of each mold member 10, which are separated at the time, and vacuum applied to the cavities 21. This exhausts the air from the grooves 17 and thus clamps the sheets of rubber stock adjacent to their edges to the mold plates. The continuation of the exhaustion draws the rubber down into the mold cavities 11 so that it becomes effectively seated in contact with the cavity surfaces. After the rubber has been seated a plug or mandrel 30 is placed in a mid-portion in one of the mold members on top of the seated rubber stock, designated A¹, and then the other mold member 10 in which stock has been correspondingly pneumatically seated is brought over the first mentioned member and mandrel and forced tightly against the same face to face by pressure. This pressure brings the two knife edges 15 into conjunction, cuts off the rubber entirely around the double nipple unit and at the same time pinches the rubber together between the bevels of the two knife edges, thus making an effective seam.
This is the position of the parts shown in Fig. 4.

The plug or mandrel mentioned as 30 is shown in side elevation in Fig. 3, and indicated in position by broken lines in Fig. 2.
It preferably has a cylindrical exterior and two annular grooves 31, these grooves being positioned at the same distance apart as the grooves 13 in the mold members. The intermediate zone of this plug is slightly larger in diameter than the two extreme zones. The result is that when the mold members are brought together, the intermediate zone $a^4$ of the rubber material A¹ is squeezed thin and shoved longitudinally into the annular cavities provided by the grooves 31 and 13, thereby producing the beads $a^3$ of the nipples. This is illustrated in Fig. 5, which shows the article as completed by the forming mold.

When the double units have been formed as above explained the mold members 10 are separated and each double unit together with the inclosed mandrel 30 is taken out and transferred to a vulcanizing mold. This vulcanizing mold consists of two plates 40, Figs. 5 and 6, each having a cavity corresponding to half of the double unit. When the double unit with its mandrel is placed in this cavity it is positioned with its formed diametric seam $a^5$ out of registration with the plane of separation of the mold plates 40. This is illustrated in Fig. 6.

Suitable internal pressure is provided by water or some heat expanding chemical placed in each section of the double unit before the forming mold members have been closed, this inclosed material expanding with the heat of the vulcanization and giving the requisite pressure against the mold walls to cause the exterior to take a perfectly smooth surface, the external rib resulting from the forming mold being pressed inwardly so that the seam is about as shown in Fig. 6, there being slight inward protuberances $a^6$ on each side of the junction.

After vulcanization, the mold members 40 are separated and the vulcanized article is severed at the base of each bead $a^3$. This produces two complete finished nipples of the form shown in Fig. 1. The intermediate portion $a^4$ is discarded, but as it contains a very slight quantity of rubber (the most of the original rubber having been squeezed into the cavities forming the beads), this is negligible.

Another form of apparatus for making the double unit nipples severable to produce the nipples of Fig. 1 is shown in Figs. 7 to 12 inclusive. In these views 50 indicate the two mold plates having double unit cavities 51 semi-circular in cross section, each surrounded by a raised rib 52 with a cutting edge. Each cavity has vents 53 leading to the other side of the mold plate. The clamping groove 54 lies in the face of the mold plate inclosing all the forming cavities, and vents 55 lead from this groove. Backing plates 56 are provided for the mold members leaving passageways 57 with which the vents communicate and which are in communication with a suitable source of vacuum not shown.

In the characteristics just described, the forming mold members 50 are similar to the mold members 10 already described. However, it will be seen from Fig. 7 that the mold cavity in this case does not correspond exactly to the form of the nipple to be produced. It has the portion 60 corresponding in contour to the bell of the nipple, but the neck portion 61, instead of flaring into the spherical head portion continues cylindrically to the end of the cavity where it terminates in a rounded end. The central portion of the cavity is shown as having one wide groove 62 of semi-circular extent, instead of the two spaced grooves 13 of Fig. 2. The purpose of this difference will be presently explained.

70 indicates a mandrel having a central hub with an annular groove 71 and two cylindrical extensions 72. Tubular passageways 73 are formed axially in these extensions while lateral passage-ways 74 and 75 adjacent to the hub and the end of the mandrel communicate with the axial passageways.

When the rubber sheet laid on the mold 50 has been clamped on the vacuum groove 54 and seated in the cavities by suction through the vents 53, the mandrel 70 is put in place and the other mold member with its seated sheet brought into conjunction, as shown in Fig. 9. Pressure applied to the plates then shears off the rubber at the knife edges 52, forming the double unit $A^5$, as shown in Figs. 9, 10 and 11. This double unit $A^5$ is then placed with its inclosed mandrel in the vulcanizing mold shown in Figs. 11 and 12. During the heat of vulcanization the expansive chemical, placed within the closed article when it was formed, expands and causes an internal fluid pressure which is distributed through the passage-ways 73, 74 and 75 to the head ends of the elongated rubber neck $a^7$, whereby these portions are forced outwardly into snug engagement with the spherical cavities 80 in the vulcanizing mold. This gives the nipple the true form. After vulcanization the vulcanizing mold is separated, and the wide enlargement $a^8$ at the center is cut in two by a single central cut, thus producing two complete nipples of the form shown in Fig. 1, without wastage.

One of the advantages of the apparatus as shown in Figs. 7 to 12, is the slight saving in waste of the discarded zone $a^4$ which was present in the operation of Figs. 2 to 6. Another advantage is that the absence of the enlarged head on the nipple as formed, enables it to be shoved end-wise into the vulcanizing mold so that the vulcanizing cavities may be continuous surfaces producing an absolutely smooth exterior, and a greater number of cavities may be carried conveniently in the vulcanizing plate than where they extend length-wise along the face of the plate.

As shown in Figs. 11 and 12, the vulcanizing mode comprises a pair of plates 82 having cylindrical openings 83 drilled through them which are occupied by cylindrical blocks 84 having cavities corresponding to the exterior of the nipple. These cavities may be accurately machined on a lathe or corresponding tool, which is an advantage over the half longitudinal cavity of Figs. 5 and 6. To enable convenient machining, of the mold shown in Figs. 11 and 12, the end portions of the cavity blocks 85 are originally separate members but are snugly and tightly secured to the blocks 84 so that there is no fin whatever formed at their junction.

With such a vulcanizing mold as described, the only possible fin is at the junction line of the two nipples where the severing cut comes, and where any fin would be entirely immaterial. After vulcanization the cooling of the mold reduces the internal pressure, and as the mold members separate the superior atmospheric pressure somewhat collapses the spherical heads of the nipples. The mold members may be readily drawn off of the nipple, the heads temporarily assuming a cylindrical form, the internal fluid in the head simply passing through the passage-way 73 and somewhat increasing the pressure in the bell of the nipple. When the vulcanized double nipple has been removed from the vulcanizing mold, it is simply severed at the center, thus producing two finished nipples which are pulled off end-wise from the mandrel.

Attention is called to the fact that my co-pending application No. 241,467, filed June 24, 1918, for a process and apparatus for making hollow rubber articles, illustrates the manufacture of a hollow rubber article about a mandrel completely inclosed by the article and contains claims directed to such subject matter, some of which also apply to the process and apparatus herein described.

Having thus described my invention what I claim is:—

1. The method of manufacturing nipples consisting of making two nipples as a continuous closed structure with their bases end to end, vulcanizing them while providing an internal pressure and thereafter severing such structure.

2. The method of making rubber nipples consisting of pneumatically seating rubber stock for two nipples end to end in two mold cavities, each comprising a longitudinal portion of the nipples, bringing such cavities together to form two complete joined nipples, and thereafter severing the nipples between their bases.

3. The method of making rubber nipples consisting of pneumatically seating rubber stock for two nipples end to end in two mold cavities, each comprising a longitudinal portion of the nipple, then bringing such cavities together to form two complete joined nipples, thereafter vulcanizing the double nipple, and then severing it to make two nipples.

4. The method of making rubber nipples consisting of seating two pieces of rubber stock by means of suction in two mold cavities, bringing such cavities together to bring the stock into edge engagement, then vulcanizing the formed double nipple, and thereafter severing the vulcanized article.

5. The process of making rubber nipples consisting of seating rubber sheet stock in mold cavities each corresponding to a longitudinal portion of two nipples end to end, bringing the seated stock together and shearing off the surplus adjacent to the edge of the duplex nipple, and thereafter severing it to produce two nipples.

6. The method of making rubber nipples consisting of seating two pieces of rubber stock in two mold cavities each surrounded by a cutting edge, bringing such cavities together to bring the stock into edge engagement to shear off the surplus stock, thereafter vulcanizing and severing the formed double nipple.

7. The process of making rubber nipples consisting of seating sheet rubber stock in mold cavities of a form adapted to make longitudinal sections of two nipples end to end, then bringing two of such duplex longitudinal sections together edge to edge to form a diametric seam about the nipple, then vulcanizing the joined article, then severing it transversely to produce two nipples.

8. The process of making rubber nipples consisting of seating pneumatically in a cavity material for two nipples placed end to end and connected together, said cavities having grooves to house material for base beads, and thereafter severing the duplex article to provide two nipples, each with a base bead.

9. The process of making rubber nipples consisting of holding raw rubber sheet stock across the mouths of cavities each corresponding to a longitudinal portion of two nipples end to end, then exhausting air from such cavities to seat such rubber stock, bringing the seated stock together and shearing off the surplus adjacent to the edge of the duplex nipple, and thereafter cutting it in two to produce two nipples.

10. The method of making rubber nipples consisting of pneumatically seating rubber stock in cavities, each corresponding to a longitudinal section of two nipples placed end to end, placing some expanding material within the article, bringing two of the seated parts together edge to edge to form a diametric seam, transferring the article to a vulcanizing mold, vulcanizing it with internal fluid pressure, and thereafter intermediately severing the article to produce two nipples.

11. The process of making rubber nipples consisting of seating rubber stock for a longitudinal section of two nipples end to end in a corresponding mold cavity, placing a mandrel in the cavity on the seated stock, bringing a correspondingly seated longitudinal section of two nipples in another mold cavity into edge engagement with the stock referred to to join such two sections by a longitudinal seam, then transferring the formed double nipple with the mandrel to a vulcanizing mold, vulcanizing the article, and thereafter severing the formed double nipple into a plurality of sections.

12. The method of making rubber nipples consisting of pneumatically seating rubber stock in two mold cavities, each comprising a longitudinal section of two nipples end to end, thickening such stock annularly, vulcanizing the duplex article, and severing it to produce two nipples each with a bead at its base formed from the thickening.

13. The process of making rubber nipples consisting of pneumatically seating rubber stock in two mold cavities, each cavity being formed to provide for two nipples placed end to end and having a groove adapted to provide an outward bead, thereafter vulcanizing the article and severing it to form two nipples.

14. The process of making rubber nipples consisting of pneumatically seating sheet rubber stock in two mold cavities, each comprising sections of two nipples placed end to end, each cavity having a transverse groove, placing in one of the cavities a grooved mandrel, bringing two of such cavities together to press the mandrel against stock in the two cavities, and thereafter vulcanizing the article and severing it to produce two nipples.

15. The process of making rubber nipples consisting of holding raw rubber sheet stock across the mouth of a mold cavity adapted to form two nipples placed base to base, causing such stock to seat in the cavities by means of suction applied to the cavities, similarly treating rubber stock held across the mouth of another mold cavity, placing a mandrel in the seated stock in one of the cavities, and bringing the other cavity into conjunction with the seated stock and mandrel, thereafter vulcanizing the formed duplex article with the mandrel in place, and then cutting the article transversely against the mandrel to produce two nipples.

16. An apparatus for the manufacture of rubber nipples comprising two mold plates, each having a cavity corresponding to a portion of two nipples placed end to end, and an internal mandrel adapted to be placed within one of the cavities after the stock is seated therein and to coact with stock seated in the cavity of the other member.

17. An apparatus for making rubber nipples comprising a pair of mold members each having a cavity substantially corresponding to a longitudinal section of two nipples placed end to end and there being a cutting edge surrounding each cavity.

18. An apparatus for making rubber nipples comprising a pair of plates each having sunk into it a series of mold cavities, each cavity substantially corresponding to half of two nipples placed end to end and there being a cutting edge surrounding each duplex cavity.

19. An apparatus for making rubber nipples comprising a pair of plates each having a cavity substantially corresponding to a longitudinal section of two nipples placed end to end and there being a cutting edge surrounding each duplex cavity, combined with a mandrel adapted to be seated within the combined cavities of the two mold members.

20. An apparatus for making rubber nipples comprising a pair of plates each having sunk into it a series of mold cavities, each cavity substantially corresponding to two nipples placed end to end and there being a cutting edge surrounding each duplex cavity, combined with a mandrel adapted to be seated within the combined cavities of the two mold members, said mandrel having an annular groove adapted to coact with a groove in the two mold members to form an annular bead on the combined article.

21. An apparatus for making rubber nipples comprising a pair of plates each having sunk into it a series of mold cavities, each cavity substantially corresponding to two nipples placed end to end, combined with a mandrel adapted to be seated within the coacting cavities of the two mold members, said mandrel having an annular groove adapted to coact with a groove in the two mold members to form an annular bead on the article, and a vulcanizing mold adapted to receive the duplex nipple with its inclosed mandrel and having a groove adapted to receive the external bead of such article.

22. The method of making hollow rubber articles, consisting of forming two of the articles as a single unit with open ends joining and closed at the other ends, vulcanizing the article with an internal fluid pressure, and thereafter severing it.

23. The method of making a hollow rubber article having an open end consisting of forming a plurality of the articles as a unit with their open ends joining, supplying an internal fluid pressure to the closed multiple article, vulcanizing it with such pressure, and thereafter severing it into individual articles.

24. The method of making a hollow rubber article having an open end consisting of forming two of the articles as a unit with their open ends joining, supplying an internal fluid pressure to the closed double article, vulcanizing it with such pressure, and thereafter severing it into two articles.

25. The method of making hollow rubber articles, consisting of forming a closed hollow multiple member with an internal mandrel, vulcanizing the article with an internal fluid pressure, and thereafter severing the article against the mandrel and removing the mandrel, leaving a plurality of complete open ended articles.

26. The process of making hollow rubber articles open at one end, consisting of forming a double article with a rubber wall itself completely inclosing a mandrel, and thereafter transversely severing the article against the mandrel.

27. The method of making hollow rubber articles closed at one end and open at the other and having a bead about the open end consisting of forming a multiple article constituting a complete inclosure and having intermediately located in it a mandrel having a groove corresponding to said bead and squeezing some of the material into the groove, and thereafter severing the article at the base of the bead.

28. The method of making hollow rubber articles closed at one end and open at the other and having a bead about the open end, consisting of forming the article as a completely closed double unit, in a mold having two annular grooves on the outside of the article and surrounding it, and squeezing some of the material into the grooves thereafter severing the article between the grooves.

29. The process of making hollow rubber articles which are open at one end, comprising forming the article as a closed double unit with an intermediately located internal mandrel, said mandrel having circumferential transverse grooves, forcing some of the rubber stock into said grooves to form beads, vulcanizing the article, and severing it transversely between the beads.

30. The process of making hollow rubber articles having an open end comprising making the article as a multiple unit, said parts having their open ends adjoining and the other ends closed, vulcanizing the unit as a whole with internal fluid pressure, and thereafter severing it into a plurality of articles.

31. The method of making hollow rubber articles having an open end, consisting of seating two sheets of rubber in molds having registering cavities corresponding to halves of the articles divided longitudinally, bringing such mold members together to make a set of complete articles joined at their bases and having a longitudinal seam, vulcanizing the article with an internal fluid pressure, and thereafter severing it into a plurality of complete articles.

32. The method of making hollow rubber articles open at one end, consisting of seating rubber stock in two mold cavities, each comprising a longitudinal section of two of the articles with their open ends adjacent to each other, thickening such stock in annular ribs to produce beads, vulcanizing the article, and severing it between the beads.

In testimony whereof, I hereunto affix my signature.

FRED THOMAS ROBERTS.